United States Patent [19]

Smits

[11] Patent Number: 5,144,652
[45] Date of Patent: Sep. 1, 1992

[54] DEVICE FOR CONNECTING A SUBSCRIBER LINE TO A SELECTED INTERNAL LINE

[76] Inventor: Johannes H. M. Smits, Oranjestraat 82, 6812 CS, Arnhem, Netherlands

[21] Appl. No.: 492,444

[22] Filed: Mar. 13, 1990

[30] Foreign Application Priority Data

Mar. 13, 1989 [NL] Netherlands ............... 8900604
Mar. 7, 1990 [NL] Netherlands ............... 9000521

[51] Int. Cl.⁵ ............... H04M 11/00; H04M 3/00; H04M 1/00
[52] U.S. Cl. ............... 379/102; 379/286; 379/342
[58] Field of Search ............... 379/281, 286, 341, 342, 379/377, 102, 100, 93, 97

[56] References Cited

U.S. PATENT DOCUMENTS

| 3,879,583 | 4/1975 | Rooks | 379/286 |
|---|---|---|---|
| 3,935,392 | 1/1976 | Smith et al. | 379/286 |
| 4,013,838 | 3/1977 | Tsai | 379/281 |
| 4,319,091 | 3/1982 | Meri | 379/342 |
| 4,618,742 | 10/1986 | Castro | 379/105 |
| 4,771,450 | 9/1988 | Castro et al. | 379/102 |
| 4,821,312 | 4/1989 | Horton et al. | 379/93 |
| 4,868,873 | 9/1989 | Kamil | 379/377 |

FOREIGN PATENT DOCUMENTS

| 59-115662 | 7/1984 | Japan. |
|---|---|---|
| 61-189071 | 8/1986 | Japan. |
| 62-200870 | 9/1987 | Japan. |
| WO87/07802 | 12/1987 | Japan. |
| 2166624 | 5/1986 | United Kingdom. |
| 2183427 | 6/1987 | United Kingdom. |

Primary Examiner—James L. Dwyer
Assistant Examiner—Wing F. Chan
Attorney, Agent, or Firm—Larson and Taylor

[57] ABSTRACT

Device for connecting one out of a plurality of internal lines (34,36) to an information exchange subscriber line, such as a telephone, facsimile or telex line, provided with decoding means (28,1-16) to detect dialling disc pulses (a), preferably on base of the time period between edges (b',b") of these pulses, timing means (9,10,12) to determine a time interval after an edge in which the next edge should occur and a test means (13) to ascertain whether said next edge occurred indeed in said interval.

4 Claims, 5 Drawing Sheets

DEVICE FOR CONNECTING A SUBSCRIBER LINE TO A SELECTED INTERNAL LINE

FIELD OF THE INVENTION

The invention relates to a device for connecting an information exchange subscriber line, such as a telephone, facsimile or telex line to one out of a plurality of internal lines, provided with decoding means to control a selector means to establish a connection on base of control signals received by said terminal.

THE PRIOR ART

Devices of the type described above are known in several forms. Patent Abstracts of Japan, vol. 12, no. 54 (E-583) [2901], Feb. 18, 1988; and JP-A-62 200 870 (TOSHIBA CORP.) 04-09-1987 disclose a system in which the arrival of a special dial signal is used in a complicated system containing a computer to switch the subscriber line from a telephone set side to a facsimile equipment side. Apart from the rather complicated apparatus with a computer, a ROM and a RAM, the special dial signal is not indicated as a normal dialling disc pulse. These pulses have a pulse width of 60 ms and an interval between two succeeding pulses of 40 ms. Though many public information exchange networks nowadays work with tone pulse selection signals (DTMF), which in practice easily are transferred from a calling set to a called set and therefor can be used as control signals to control the selector means, a series of trials in many telephone networks all over the world has made clear, that dialling disc pulse signals ofter are so deformed that reliable decoding is hardly possible. The strong deformation of these pulses, when sent over a telephone connection is probably due to the important component of 10 Hz, which is suppressed far more severely than for instance speech frequencies.

Patent Abstract of Japan, vol. 8, no. 235 (E-275) [1672], Oct. 27, 1984 describes a system in which a speech signal (talkie) is necessary to let the calling party dial a number "0", without indicating whether this number is dialled in the DTMF mode or the dialling disc mode. Patents Abstract of Japan, vol. 11, no. 17 (E-471) [2464], Jan. 17, 1987 describes a system in which the calling party dials a specific key signal by reason of which a push button signal reception circuit activates a relay. It is obvious that such a reception circuit is part of a DTMF system.

GB-A-2 166 624 uses a remote control signal in a complicated system containing for instance a personal computer, a speech synthesis circuit and a telephone answering device. This control signal is generated by depressing a button, so that obviously no dialling disc pulses are suggested.

In all these citations no solution has been given for the problem to provide a system which can be called by any subscriber all over the world. That is to say a system compatible with dialling disc pulses. It is the above analyses which forms the base of the invention.

SUMMARY OF THE INVENTION

Accordingly the invention is characterized in that the decoding means contain discrimination means controllable by normal dialling disc pulses of a calling apparatus.

A feature enabling a simple and "all over the world" reliable device is based on the insight, that the mutual time distance between the dialling disc pulses is very little altered by the deforming occurring between the calling set and the called one. Accordingly a further elaboration of the invention provides that the first occurrence is that of a leading edge of a dialling disc pulse.

Further it has been established that the edges of the dialling disc pulses are always retrievable, especially if a filter emphasizes frequencies of more than fifteen to preferably forty times the dialling disc pulse repetition frequency. Because the latter is 10 Hz a filter emphasizing the region from 150 to 400 Hz in practice does well.

BRIEF DESCRIPTION OF THE DRAWINGS

The invention is elucidated on hand of the drawing, in which.

DESCRIPTION OF THE PREFERRED EMBODIMENTS

Figure 1:
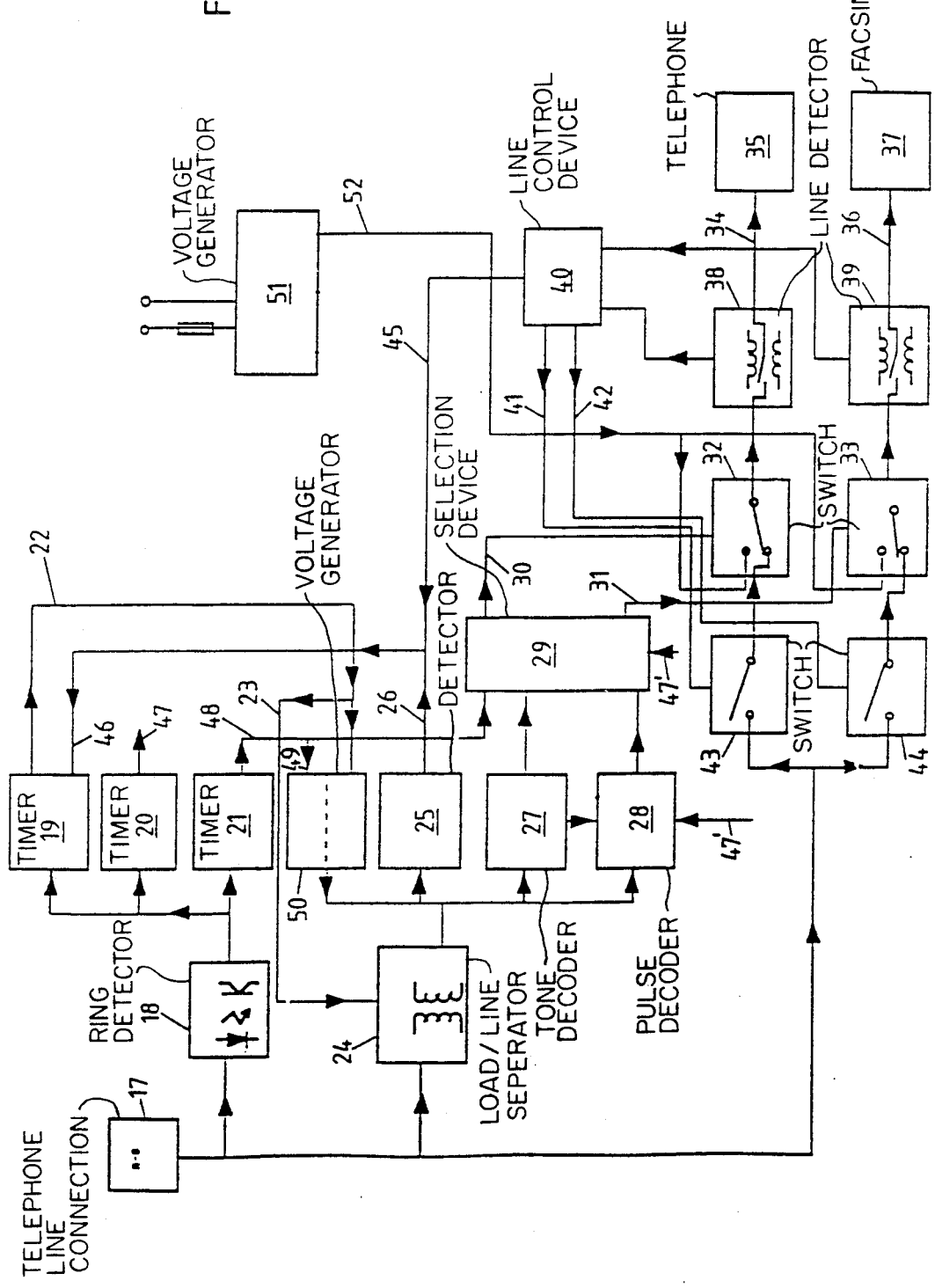
FIG. 1 is a general block scheme of an inventive device.

In FIG. 1 reference 17 indicates a normal telephone line connection or A-B line. A ringing voltage detector 18 is permanently coupled with this line and responds to the ringing voltage. This detector may contain a light emitter and a photo sensitive switch for contact free coupling with the inventive device.

When the ringing detector detects a ringing voltage this is fed to three timing devices 19, 20 and 21. Device 19 energizes its output line 22 immediately after receipt of the ringing voltage and de-energizes it after its set period, for instance 60 sec. Via a branch 23 the output 22 is connected to a load and line separation device 24, which with energizing of 22 applies a normal line load between the A-B lines and transmits signals from these lines with a transformer to three detectors 25, 27 and 28. Detector 25 detects the occupied signal which is received when the calling party disrupts the connection. Then via 26 and 46 the timing device 19 is reset and via 22 and 23 the load and line separation device 24 is switched off.

This device 24 is connected to a known tone frequency (DTMF) decoder 27, which detects selection pulses of different frequencies as are usual with push button telephone sets.

Further device 24 is connected to the input of a pulse decoder 28 which can detect dialling disc pulses. The connection between 27 and 28 indicates that 27 on receipt of signals can disable decoder 28.

Both decoders 27 and 28 are connected to a selection device 29, which on base of the decoding result of 27 and 28 energizes line 30 or line 31. Voltage on line 30 or 31 reverses ringing signal contact 32 or 33 respectively, so that a ringing signal is fed to either the first internal line 34 connected to for instance a telephone set or to the internal line 36 connected to a facsimile equipment. The ringing signal is issued by a ringing voltage generator 51 and transferred by line 52.

As long as the selected apparatus 35 or 37 has not answered the related line detector 38 or 39 carries only the current caused by the ringing voltage, which on the average is too small to cause the line control device 40 to become active. When the selected apparatus has answered the related line detector 38 or 39 will feed an effective control signal to the line control device 40, which via line 41 or 42 causes contact 43 or 44 to close, so that the A-B line 17 is connected with the selected apparatus. Then via lines 45 and 46 timing device 19 is reset and the voltage on 22 vanishes, so that via 23 the load and line separation device 24 is switched off.

Because it is possible that certain callers only know the normal telephone number and not the further code to choose between for instance telephone and facsimile, the detector may be designed to make its own choice and choose via the line control device 40 always the telephone 35, if no additional selection pulses are received.

After activation the timing device 20 issues a voltage of short duration on its output 47, which is connected (not shown) to the reset inputs 47' of the decoder 28 and the selection device 29, by reason of which they are stopped.

The timing device 21 which has for instance a signal period on its output 48 of 5 sec. enables selection device 29 to be active and further supplies a first input 49 to a combined dialling tone and ringing voltage generator 50. The latter receives as second input the output 22 of timing device 19. With the presence of a signal from the timing device 21 and from the timing device 19 a dialling tone is supplied to the A-B line, in which time period the caller may insert additional selection ciphers or symbols (e.g. numbers), but will after termination of the period of 21, which may be 5 sec. for instance, until the end of the activity of the timing device 19 issue a ringing voltage. If therefor no connection with the internal line 34 or 36 is realized one will hear the ringing signal and the load and line separation device will be switched off in any case after lapse of the period of the timing device 19, even when no signal is present on line 45.

FIG. 1 further shows a feeding device 51 which not only supplies the normal feeding voltages but also, namely on line 52, a permanent ringing voltage.

The depicted device in a short time establishes a connection with apparatus 35 or 37, if the selection signals following the telephone number indicate the one or the other, wherewith it is also possible to choose always the one or the other in case such signals are not received. The public service will detect the connection with the whole device, so that payment is due from the moment that the load and line separation device is switched on. The time during which the telephone 35 may ring without being answered is limited by the timing device 19.

Further the decoder 28 may be or contain an adjustable or interchangeable unit. In that instance the device may be such that in case the received code does not satisfy predetermined exigencies, no connection at all is established. Consequently one may adapt its own secret number, which may be enabled or disabled by the subscriber itself. Also he can modify it. With this embodiment of the invention it is desired that the DTMF decoder 27 via the decoder 28 is connected to the selection device 29.

In the shown embodiment only two internal lines 34 and 36 have been shown, but it will be clear that the principles of the invention may be used to establish connection with one out of any number of internal lines.

Figure 2:
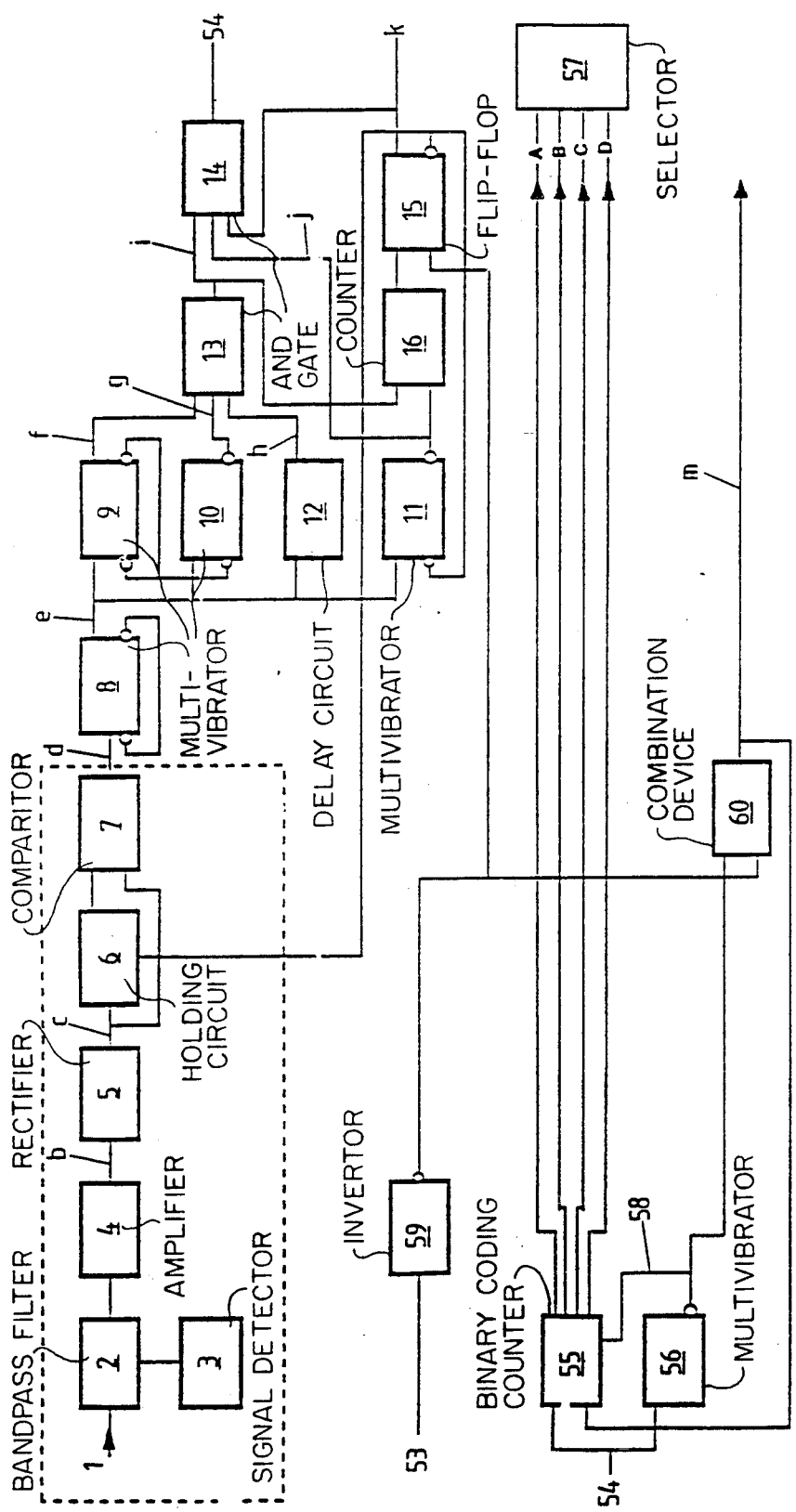
FIG. 2 is a detail block scheme elucidating the pulse detection apparatus of the invention.

In FIG. 2 reference 1 is the input of a device for recognizing and detecting dialling disc pulses so as decoder 28 of FIG. 1. Reference 2 is a filter which emphasizes frequencies in the lower central region of the speech spectrum, for instance from about 150 to 400 Hz.

A signal detector 3 gates filter 2 in such a way that no output occurs in case of a too high signal level. After the amplifier 4 the signal is fed to a double rectifier issuing only signals of one sense or polarity. From there the signal is fed to a sampler and holding circuit 6 feeding one input of a comparator 7, the second input of which comes from the rectifier 5. The circuit 6 issues a short pulse in case the signal from 5 is greater than a predetermined fraction of the sample value retained by 6.

A mono stabile multivibrator or one-shot 8 with a trigger period of 25 ms has its inverse output connected to an inhibition input, so that it is impossible to trigger it again in the time it is already triggered. The output of 8, only consisting of pulses of 25 ms is fed to the triggering input of one-shots 9, 10 and 11 with triggering periods of 75, 50 and 400 ms respectively. Further a delay circuit 12 with a delay time of 10 $\mu$s sees to it, that the one-shots 9 and 10 are completely set when 12 issues its output signal. The inverted output of one-shot 9 is connected to inhibition inputs of the one-shots 9 and 10 and prevents that these one-shots are triggered again when 9 is already set.

The outputs of the circuits 9 and 10 are each connected to one input of an AND gate 13, the output of which is connected to an input of a second AND gate 14. The second input of AND gate 14 comes from the inverse output of the one-shot 11 with a trigger periode of 400 ms.

The inverse output of one-shot 11 is also connected to the reset input of a counter 16, the count input of which is the output of AND gate 13. The output of the counter 16 triggers a flip flop 15 after a predetermined number of count steps, in this case seven. The output k of flip flop 15 is connected to the third input of AND gate 14. This means that the third input of AND gate 14 is permanently enabled as long as flip flop 15 is not reset. This can only be done by the output of the invertor 59 controlled by a control line 53. The inverse output of flip flop 15 is connected to an inhibition input of the one-shot 11, so that triggering of 15 inhibits further triggering of 11. Consequently the inverse output j of 11 will become high after termination of its trigger period of 400 ms. Then the second and third inputs of AND gate 14 are enabled and all output pulses of AND gate 13 reach the output 54 of the AND gate 14.

This output 54 is connected to a binary coding counter 55, which energizes its outputs A, B, C and D in correspondence with the representation of ciphers in the tone frequency system (DTMF). A selector device 57 is controlled by the outputs A, B, C and D, which means that the same selector device can be used for either dialling disc pulses or DTMF tones.

Output 54 also triggers an one-shot multivibrator 56 having a set period of for instance 120 ms, which is longer than the period of a dialling pulse (that is to say the time between the start of two succeeding pulses in one cipher, which is about 100 ms).

The inverse output 58 of 56 causes 55 to read out, which will happen 120 ms after receipt of the last pulse from 14. An interval of 120 ms does not occur with the pulses of a dialling disc in one cipher but does occur at the end of a cipher.

A control signal 53 is fed to an invertor 59 at the moment a call is received and will reset flip flop 15, which reverses its inverse output, so that one-shot 11 and sample holding device 6 are enabled again. A combination device 60 enables or disables in dependence of the output of one-shot 56 the control line m, the function of which is no part of the invention.

Figure 3:
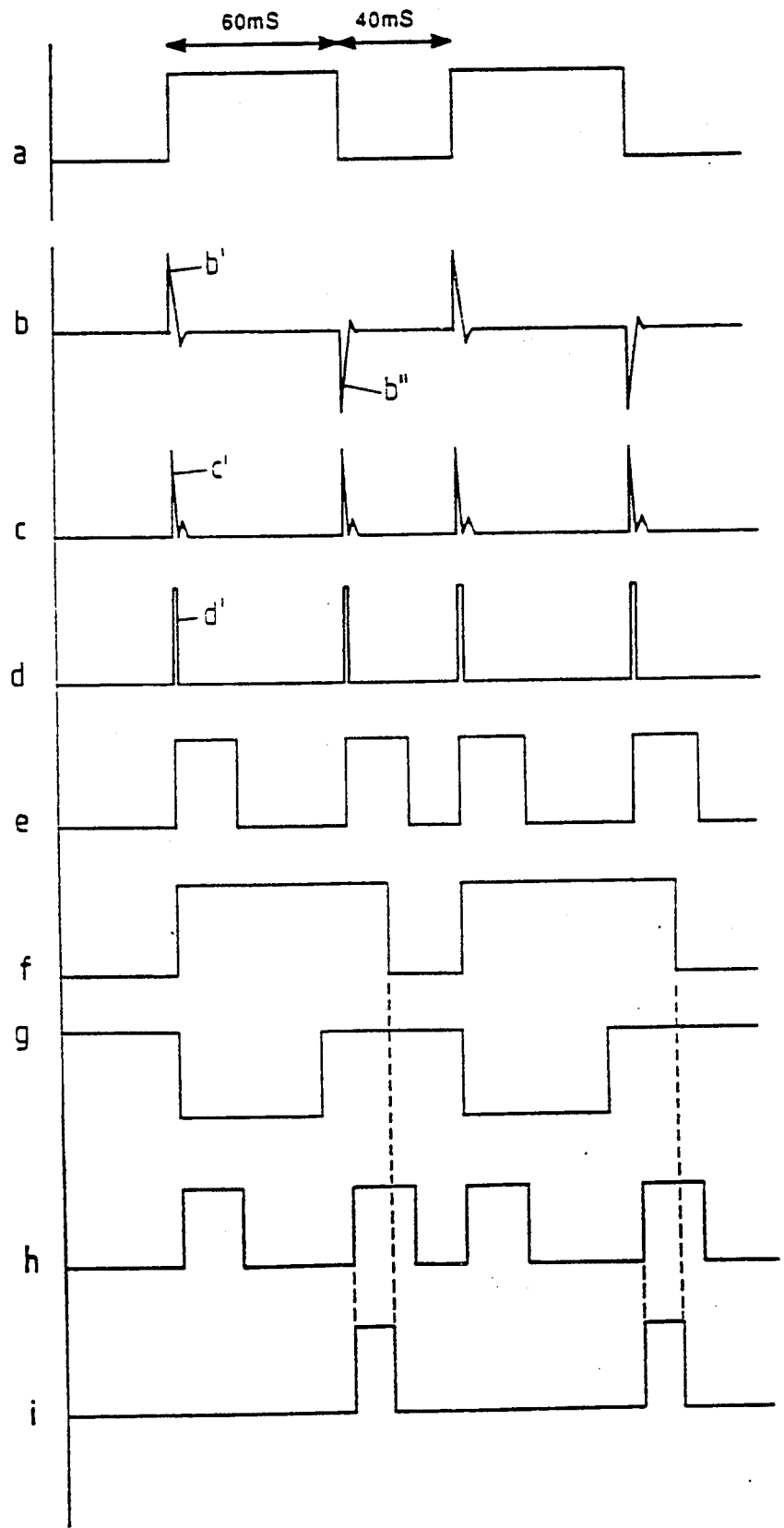
FIGS. 3, 4 and 5 show time graphs of signals occurring in different parts of the apparatus.

In FIG. 3 graph a shows the output of the dialling disc device of the calling apparatus. Graph b shows the remains of this signal after passing some telephone lines, a central telephone exchange and the filtering device 2. In the same way the graph c-i of this FIG. 3 show the signals occurring at the same points c-i of FIG. 2. In fact graph h has a very small delay with respect to graph e, which in the drawing has been exaggerated but has no purpose but to make sure that the one-shots 9 and 10 have completed their triggering action before graph e which now is retarded to graph h becomes high.

Figure 4:
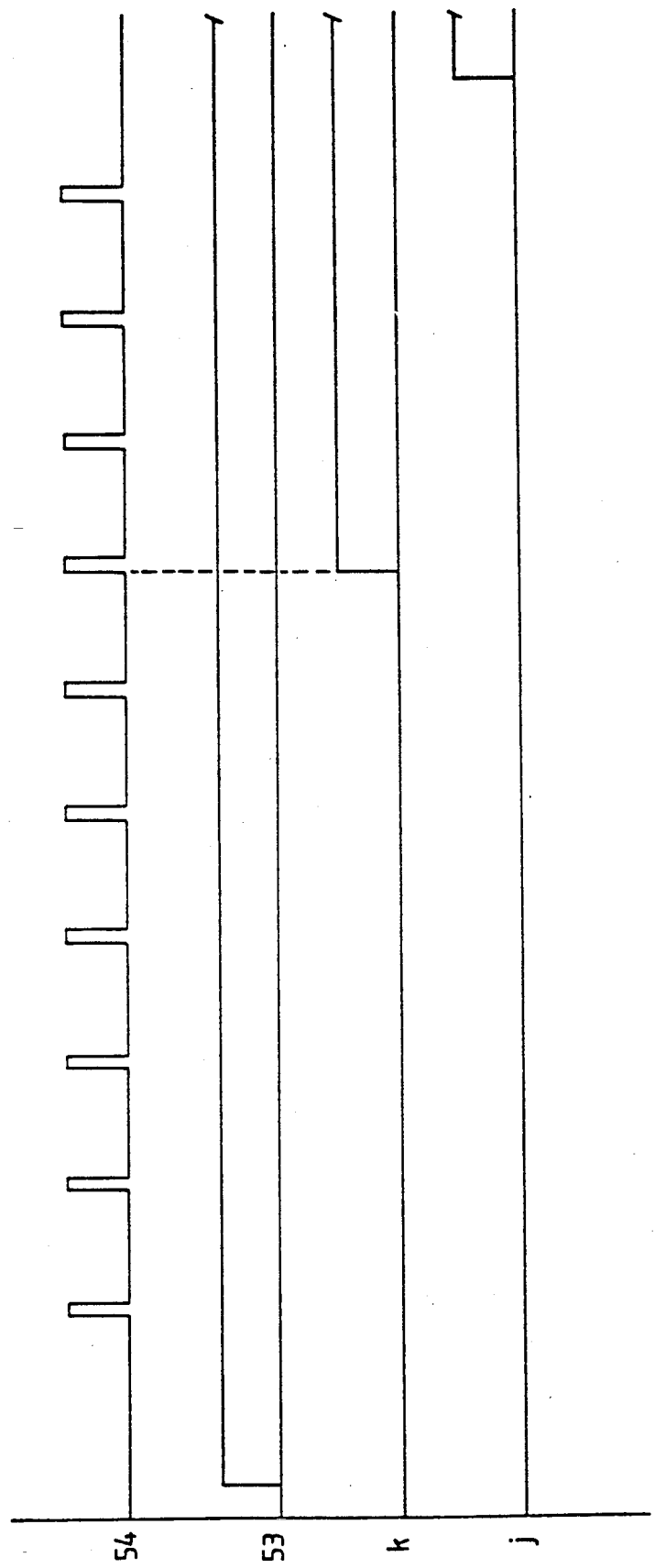

FIG. 4 shows the voltages occurring at 54, 53, k and j respectively, when a cipher zero is dialled. After seven pulses counter 16 triggers flip flop 15 and k becomes high. From that moment one shot 11 cannot be retriggered, so that it resets after its set period of 400 ms and makes j high, so that gate 14 is opened.

Figure 5:
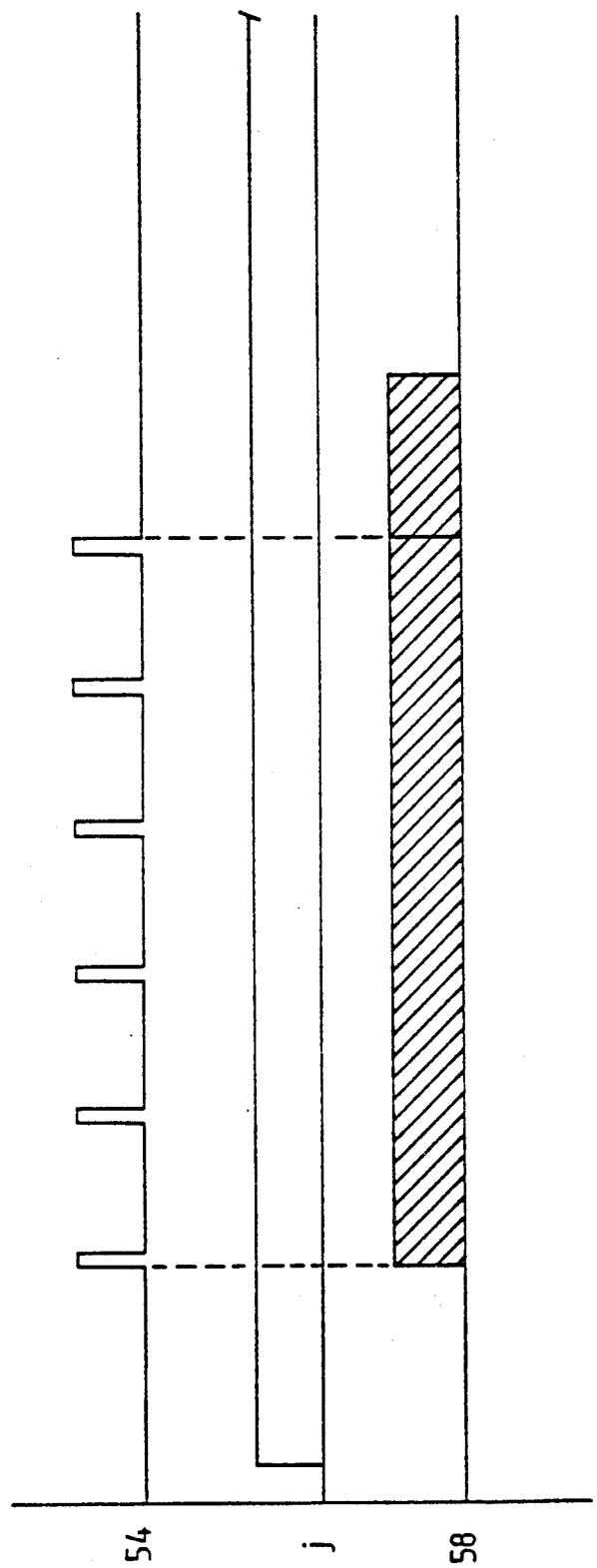

FIG. 5 shows the voltages on lines 54, j and 58, when after the first cipher zero, a six is dialled. Then j is already high (as is k) so that gate 14 is open. With the first pulse on 54, one-shot 56 is triggered and 58 becomes high. Each pulse sets 56 again, so that it is again at the beginning of its set period, which is longer than the repetition period of the pulses. If, however, after the sixth pulse no further pulses occur one-shot 56 is reset and 58 becomes low. Then the binary coding counter 55 is read out and selection device 57 establishes the connections necessary to connect the A-B- line 17 to the selected apparatus.

Though the invention has been elucidated on hand of a particular embodiment, it will be clear that many elements or circuits can be replaced by well known equivalents without departing form the scope of the invention.

I claim:

1. A device for connecting an information exchange subscriber line, such as a telephone, facsimile or telex line, to one of a plurality of internal lines, said device comprising a decoding means including discriminator means for recognizing rotary dialing disc pulses which have been distorted by telephone lines and exchanges of a calling apparatus, said discriminator means including timing means for determining a time region after an edge of a rotary dialing disc pulse and a coincidence means for ascertaining coincidence of an edge of a rotary dialing disc pulse and said time region, said device further including, connected to the input of said discrimination means, filter means for emphasizing the most significant portions of the distorted rotary dialing disc pulses, a sample and hold circuit connected to the output of said filter means for retaining said portions of rotary dialing pulses and a comparator means connected to said sample and hold means for comparing a predetermined fraction of the pulse value retained by said sample and hold circuit with an input pulse, said device further including a counter for counting a number of pulses equal to or smaller than the number of pulses of a predetermined initial test cipher and switching means controlled by said counter for setting the sample and hold means.

2. A device according to claim 1 in which the timing means includes a first monostable multivibrator having its inverting output connected to an inhibiting input, and its non-inverting output to the control inputs of second and third monostable multivibrators, the inverting output of the second monostable multivibrator being connected to the inhibiting inputs of the second and third monostable multivibrators, the non-inverting output of the second monostable multivibrator and the inverting output of the third monostable multivibrator being connected to inputs of an AND gate, and the output of said AND gate being connected to the input of the said counter.

3. Device according to claim 2, in which the non-inverting output of the first monostable multivibrator is connected to the input of a delay device having a delay time period of considerable shorter duration than the duration of a rotary dialing disc pulse, said delay device being connected to a further input of said AND gate.

4. Device according to claim 2 in which the first monostable multivibrator has a set period of less than 50 ms, the second monostable multivibrator has a set period of more than 60 ms and the third monostable multivibrator has a time period of about 50 ms.

* * * * *